(12) United States Patent
Morton et al.

(10) Patent No.: US 12,737,895 B2
(45) Date of Patent: Sep. 15, 2026

(54) SYSTEM AND METHODS FOR MONITORING AIRBORNE TARGETS

(71) Applicant: Wildlife Imaging Systems LLC, Hinesburg, VT (US)

(72) Inventors: Brogan Page Morton, Hinesburg, VT (US); Jonathan Ritter, Shelburne, VT (US)

(73) Assignee: Wildlife Imaging Systems LLC, Hinesburg, VT (US)

( * ) Notice: Subject to any disclaimer, the term of this patent is extended or adjusted under 35 U.S.C. 154(b) by 308 days.

(21) Appl. No.: 18/639,001

(22) Filed: Apr. 18, 2024

(65) Prior Publication Data

US 2024/0362797 A1 Oct. 31, 2024

Related U.S. Application Data

(60) Provisional application No. 63/462,634, filed on Apr. 28, 2023.

(51) Int. Cl.

| | |
|---|---|
| ***G06V 10/40*** | (2022.01) |
| ***G06T 7/12*** | (2017.01) |
| ***G06T 7/194*** | (2017.01) |
| ***G06T 7/20*** | (2017.01) |
| ***G06T 7/62*** | (2017.01) |
| ***G06T 7/70*** | (2017.01) |

(52) U.S. Cl.

CPC .................. *G06T 7/20* (2013.01); *G06T 7/12* (2017.01); *G06T 7/194* (2017.01); *G06T 7/62* (2017.01); *G06T 7/70* (2017.01); *G06V 10/40* (2022.01); *G06T 2207/10016* (2013.01); *G06V 2201/07* (2022.01)

(58) Field of Classification Search

None

See application file for complete search history.

(56) References Cited

U.S. PATENT DOCUMENTS

| | | | | |
|---|---|---|---|---|
| 6,369,904 | B1 * | 4/2002 | Bhattacharjya .... | H04N 1/32144 358/1.14 |
| 9,521,830 | B2 | 12/2016 | Wenger et al. | |
| 9,816,486 | B2 | 11/2017 | Wenger et al. | |
| 9,856,856 | B2 | 1/2018 | Wenger et al. | |
| 9,881,207 | B1 * | 1/2018 | Nguyen ................. | G06N 3/044 |
| 10,275,679 | B2 * | 4/2019 | Jorquera ............... | G06F 16/583 |

(Continued)

*Primary Examiner* — Amandeep Saini
*Assistant Examiner* — Caroline Tabancay Duffy
(74) *Attorney, Agent, or Firm* — Master Key IP, LLP; Justin G. Sanders

(57) ABSTRACT

A system and associated methods are disclosed for automatically detecting, tracking and classifying an at least one object, moving within an environment proximal to a structure, using a camera. In at least one embodiment, a processor receives a plurality of video frames as captured by the camera. For each of the video frames, the processor detects the presence of the at least one object within said video frame, creates a track for each of the at least one detected object, identifies each track as either an acceptable track or noise, classifies each of the acceptable tracks, and generates an at least one summary image that visually represents the at least one detected object within the environment proximal to the structure, allowing for validation and performance evaluation of the object detection, tracking, and classification process.

18 Claims, 9 Drawing Sheets

(56) References Cited

U.S. PATENT DOCUMENTS 10,519,932 B2 12/2019 Wenger et al.
10,883,473 B2 1/2021 Wenger et al.
10,920,748 B2 2/2021 Wenger et al.
11,544,490 B2 1/2023 Jorquera et al.
11,555,477 B2 1/2023 Wenger et al.
11,751,560 B2 9/2023 Wenger et al.
2011/0081043 A1* 4/2011 Sabol ...................... G06T 7/254 382/103
2015/0130926 A1* 5/2015 Sheridan, III ......... G01N 21/47 348/128
2017/0083765 A1* 3/2017 Risinger .............. G06V 10/751
2019/0147569 A1* 5/2019 Strandemar ............. G06T 3/403 382/255
2020/0166019 A1* 5/2020 Lin ........................... G06T 7/33
2020/0167938 A1* 5/2020 Matzner ................. G06V 20/00
2023/0287866 A1* 9/2023 Jorquera ............... G06F 16/583
2023/0292738 A1 9/2023 Wenger et al.
2024/0057583 A1 2/2024 Wenger et al.
2024/0193946 A1* 6/2024 Helseth .................. G06V 20/41

* cited by examiner

SYSTEM AND METHODS FOR MONITORING AIRBORNE TARGETS

RELATED APPLICATIONS

This application claims priority and is entitled to the filing date of U.S. provisional application Ser. No. 63/462,634, filed on Apr. 28, 2023. The contents of the aforementioned application are incorporated herein by reference.

GOVERNMENT LICENSE RIGHTS

This invention was made with Government support under Grant No. DE-SC0021867, awarded by the U.S. Department of Energy (DOE). The Government has certain rights in this invention.

BACKGROUND

The subject of this patent application relates generally to object monitoring, and more particularly to a system and associated methods for automatically detecting, tracking and classifying an at least one object, moving within an environment proximal to a structure.

Applicant hereby incorporates herein by reference any and all patents and published patent applications cited or referred to in this application.

By way of background, monitoring wildlife around energy infrastructure using a camera requires capturing hours of video and extracting only the relevant information from it. The amount of video required precluded using humans to detect novel objects, so the video must be processed using software to perform the extraction. This software must be able to ignore objects that are not of interest, e.g., wind turbines, while detecting and classifying target objects, e.g., birds and bats, with high accuracy. Previous solutions used background subtractors to identify novel objects in each video frame, detections, creating a cropped version of the image containing only the object and then training and applying neural networks to determine the class of the object. That means that each detection is classified independently. However, these prior solutions suffer from three major failings. First, they require large amounts of labeled data to train a neural network, which is time-consuming and expensive. Second, the classification accuracy of the neural network can be reduced when it is used in a new context. Third, the accuracy of classification using a neural network suffers when the object is far from the camera and becomes small in the image, leading to confusion between different objects. Accordingly, there remains a need for a system capable of more accurately detecting, tracking and classifying an at least one object, moving within an environment proximal to a structure, using a camera.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a system and associated methods for automatically detecting, tracking and classifying an at least one object, moving within an environment proximal to a structure, using a camera positioned such that the structure is within a field of view of the camera. In at least one embodiment, a processor receives a plurality of video frames as captured by the camera. For each of the video frames, the processor performs a structure masking process on said video frame in order to isolate and subtract the structure from within said video frame, detects the presence of the at least one object within said video frame, and the calculates a plurality of detection features of the at least one detected object within said video frame. The processor creates a track for each of the at least one detected object, said track representing a path of movement followed by the corresponding one of the at least one detected object across the plurality of video frames, identifies each track as either an acceptable track or noise, calculates a plurality of track features for each acceptable track, classifies each of the acceptable tracks, and generates an at least one summary image that visually represents the at least one detected object within the environment proximal to the structure, allowing for validation and performance evaluation of the object detection, tracking, and classification process.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
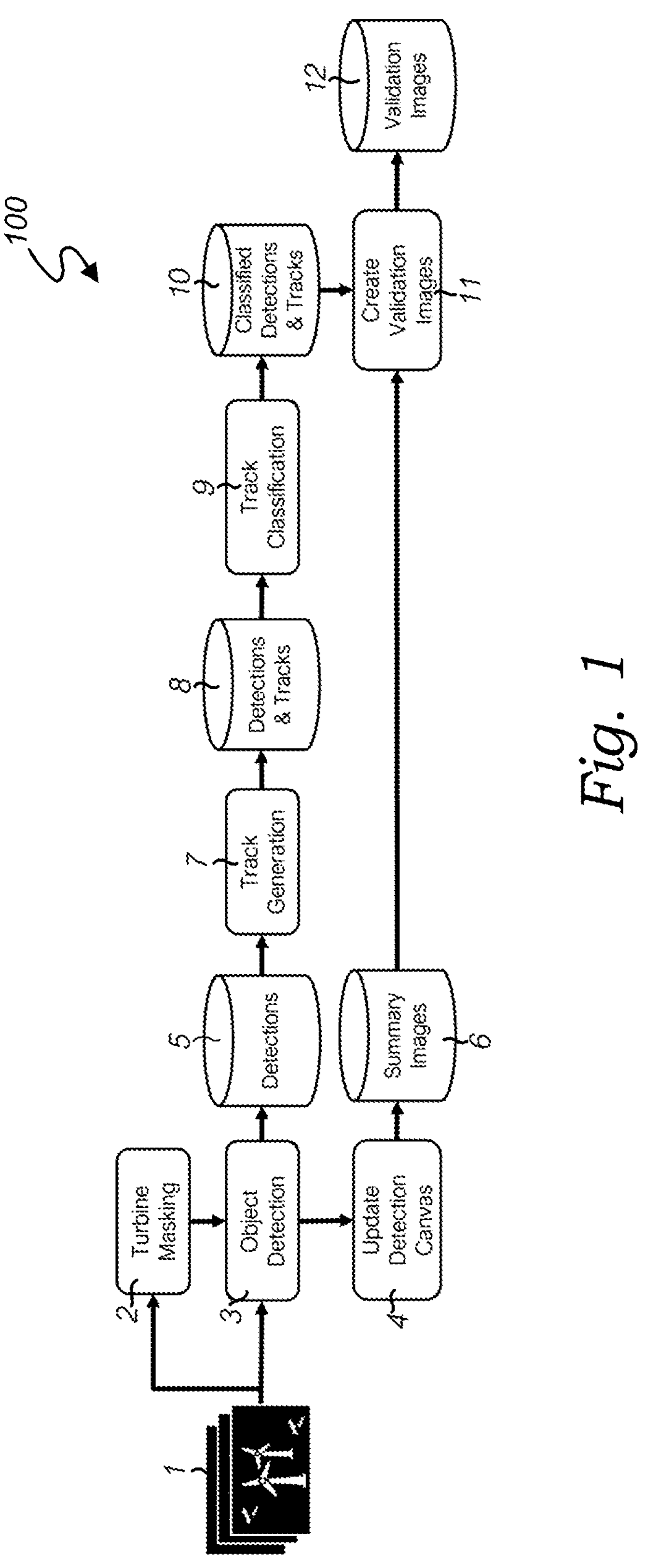
FIG. 1 is a flow diagram illustrating an exemplary method for detection, tracking and classification of airborne targets using a camera depicting a process of monitoring wind turbines and object detection in their surrounding environment, in accordance with at least one embodiment.

Turning now to FIG. 1, there is shown a flow diagram illustrating an exemplary method for detection, tracking and classification of airborne targets using a camera depicting a process of monitoring structures (such as wind turbines, for example) and object detection in their surrounding environment, in accordance with at least one embodiment. In that regard, it should be noted that while the system and associated methods are primarily described herein as being used in connection with wind turbines, the system and associated methods should not be so limited. Instead, in further embodiments, the system and associated methods may be utilized in connection with any other type of structure, now known or later developed, where there is a need for automatically detecting, tracking and classifying an at least one object moving within an environment proximal to the structure.

In at least one such embodiment, the process 100 begins with a video stream, where video stream includes a series of image frames (herein referred to as "video frames" 1) derived from a camera. Data from the video stream undergoes turbine masking 2, which isolates wind turbines in the input data and reduces the impact of noise or irrelevant objects.

It is important to ignore the constant motion of some objects, like an operating wind turbine, without compromising detection sensitivity. Next, object detection 3 identifies and locates objects in the vicinity of the wind turbines or within the video stream, utilizing the masked input data from the turbine masking 2 process.

Data from object detection 3 is then transferred to detections 5 which represent the detected objects resulting from the object detection 3 process. In some embodiments, detections 5 may be an output database from object detection 3 and an input to track generation 7. In some embodiments, detections & tracks 8, summary images 6, classified detections & tracks 10, and validation images 12 may be outputs from the proceeding functions. These detections are then processed at a track generation 7 module, which creates tracks for the detected objects. In some embodiments, track generation 7 comprises a density-based clustering algorithm and the generation of tracks for detected objects. This top-level function is broken into subfunctions in FIG. 4. The tracks are combined with the detections to form detections and tracks 8 and subsequently classified by the track classification 9 module, resulting in classified detections and tracks 10.

Referring to object detection 3, data may also be transferred to an update detection canvas 4. The update detection canvas 4 process then updates the visual representation of the detected objects and wind turbines, incorporating information from both turbine masking 2 and the object detection module 3. This information is sent to a summary image 6 where it is ingested in a create validation images 11. In some embodiments, summary image 6 may be an output of update detection canvas 4.

The create validation images 11 process utilizes the information from classified detections and tracks 10 as well as summary images 6, which are generated using the update detection canvas. The final output of the system is a set of validation images 12 that represent the monitored wind turbines and detected objects, providing a comprehensive understanding of the turbines' environment.

Figure 2:
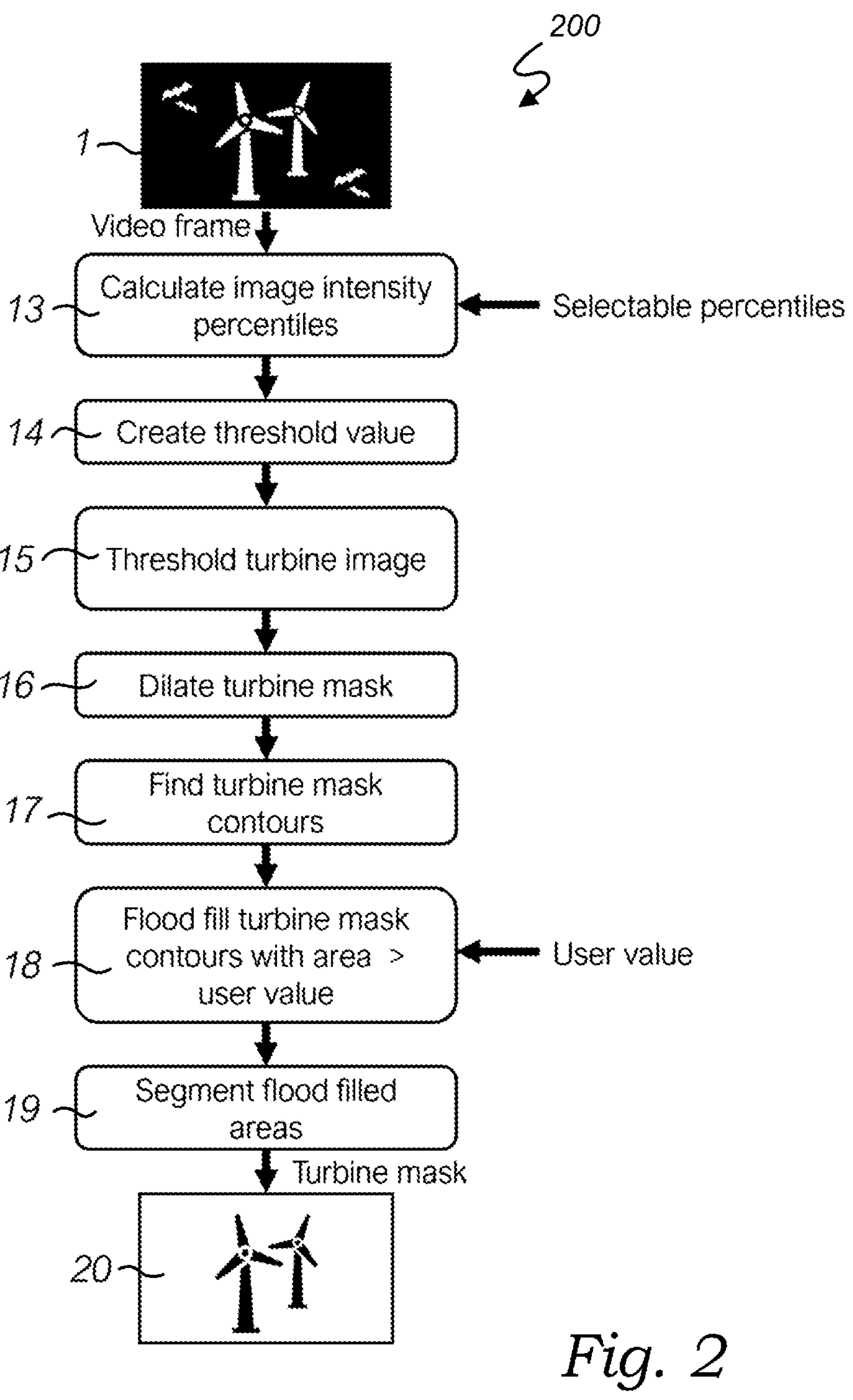
FIG. 2 is a flow diagram illustrating an exemplary method for creating a turbine mask and detecting objects in a video frame featuring wind turbines, in accordance with at least one embodiment.

FIG. 2 is a flow diagram illustrating an exemplary method for creating a turbine mask and detecting objects in a video frame 1 featuring wind turbines, in accordance with at least one embodiment. In at least one such embodiment, the process 200 starts with the video stream from FIG. 1. Each video frame 1 of the video stream undergoes a series of operations, starting with the calculation of image pixel intensity at user-selectable percentiles 13. These percentiles help determine the number of pixels making up the turbine within the image, based on the camera's field of view. Next, a threshold value is created by using a weighted average of the percentile values 14, which is then applied to the video frame, creating a mask of all values above the threshold 15. The mask is dilated to connect any nearby mask regions 16, and all contours in the mask are found, representing objects in the original image 17.

To ensure that the final mask does not include non-turbine objects, each contour above a user-selectable area is flood-filled, which is the process of filling in the outline of the contours to ensure that all pixels within the contour are included, with a unique value 18. In at least one embodiment, flood-filling is the process of filling in the outlines of a turbine to ensure processing is not performed on these areas of the videos. Flood filling may fill in all pixels within the outline of the turbine contours found in find turbine mask contours 17 so that they can be included in the turbine mask. This is necessary since only the contours (or the outline of the turbine) may be included in the mask if the pixels in the contours were not filled. This process may be similar to coloring in between the lines of an outlined picture (e.g., as in color by number picture books) so that the whole of the turbine is filled in and included in the mask. Only the flood-filled regions 19 are used for the final turbine mask 20. The object detection operation 3 aims to automatically detect novel objects in the masked video frame, which is further described in FIG. 3.

Figure 3:
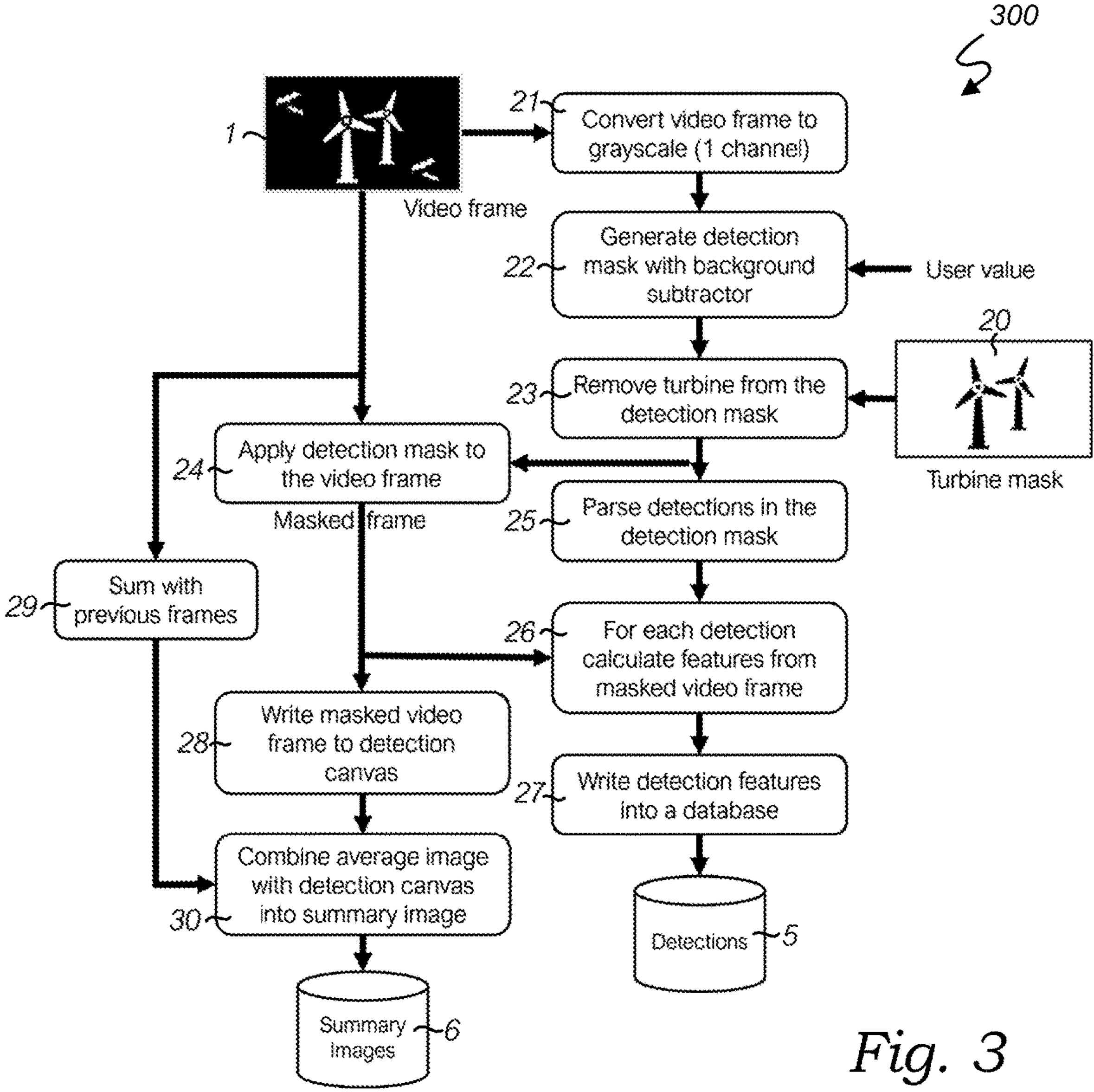
FIG. 3 is a flow diagram illustrating an exemplary method for object detection, feature extraction, and creation of summary images in the video processing pipeline for wind turbine farms, in accordance with at least one embodiment.

FIG. 3 is a flow diagram illustrating an exemplary method for object detection, feature extraction, and creation of summary images in the video processing pipeline for wind turbine farms, in accordance with at least one embodiment. In at least one such embodiment, process 300 involves simultaneously processing a video frame 1 in three different ways, where the video frame 1 is converted from color to single-channel grayscale value 21, which increases the speed and reduces the complexity of the object detection by only processing one channel as opposed to three without any loss in performance, and feeding it into a background subtractor that segments the image into background and foreground 22. This is performed to make the processing easier and faster. Color images may generally include three channels (e.g., red, green, and blue or RGB) and processing may need to be done on all three channels. Converting to grayscale allows the disclosed process to use a single channel to improve the speed of processing and reduce the complexity of having to repeat this process for two additional channels. The detection mask is generated by modeling the image background, subtracting it from the incoming image, and determining which parts of the image deviate significantly. Any object that exceeds the user defined threshold value is considered part of the foreground and becomes part of the detection mask. The user value 22 is a threshold that can be selected which represents the difference needed during the background subtraction in order for an object to be considered a foreground object. Only objects that exceed this threshold become part of the detection mask. The turbine mask is then used to remove any detections originating from the turbine 23. Morphological operations are applied to the detection mask, and the mask is applied to the original video frame 1 to create a masked frame 24.

In at least one embodiment, data from detection mask 23 is further processed when all contours in the detection mask are found 25, and during each iteration, small images are cropped from the masked detection using the boundaries of the contour. Features of the detection are calculated using pixel values associated with detection 26, such as the mean and standard deviation of the detection pixel intensity value. Other features about the size, shape, and location of the detection in the frame are calculated, including X and Y position, an area in pixels, and perimeter length of the detection. The software saves all the detection features 27 into a database 5.

In at least one embodiment, process 300 further processes video frame 1 using a series of processing steps to generate a summary image 6 that captures object detections and tracks within the wind turbine environment. Initially, the video frame 1 is passed through the "Apply Detection Mask to the Video Frame" module 24, which retains the original pixel values of the detected object areas, creating a masked frame. Subsequently, the masked frame is written onto a detection canvas that persists throughout the entire video by the "Write Masked Video Frame to Detection Canvas" module 28. Meanwhile, the video frame 1 is also processed by the "Sum with Previous Frames" module 29 to maintain a running sum of the frames, which is later used to calculate an average frame. Once all the video frames have been processed or at fixed intervals, the "Combine Average Image with Detection Canvas into Summary Image" module 30 merges the accumulated detection canvas and the average frames, resulting in a single summary image 6 that visually represents the detections and tracks within the wind turbine environment.

In at least one embodiment, the detections from the video are then connected into tracks 7, representing the path followed by a single object through time. Ideally, these tracks will contain all the positions of the object from the time it entered the video frame until it exited. This algorithm requires each connected detection within the track to be both spatially and temporally close to one another, which helps eliminate "noise" or disconnected detections in the dataset.

Figure 4:
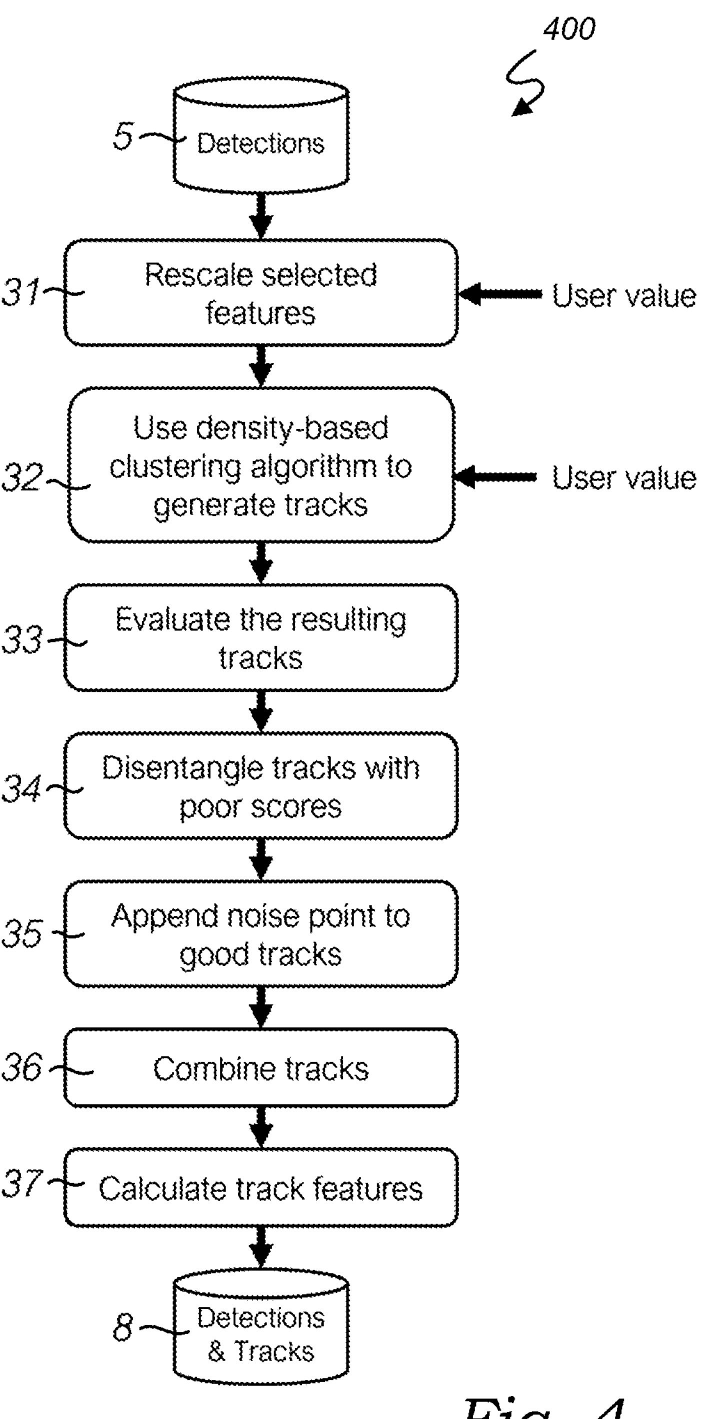
FIG. 4 is a flow diagram illustrating an exemplary density-based clustering algorithm and the generation of tracks for detected objects within the wind turbine environment, in accordance with at least one embodiment.

FIG. 4 is a flow diagram illustrating an exemplary density-based clustering algorithm and the generation of tracks for detected objects within the wind turbine environment, in accordance with at least one embodiment. In at least one such embodiment, the process 400 begins with detections 5 from FIG. 1, which then rescales selected features for each detection 31, such as X and Y pixel position, timestamp, and detection area. For example, a detection at position 200, 300 in the video frame 1, with a timestamp of 5 seconds and an area of 500 pixels, would be rescaled to ensure that differences between time, spatial, and geometric features share a common amplitude in the rescaled feature space. The rescaled feature vectors are then input into a density-based clustering algorithm (such as DBSCAN or OPTICS, for example), resulting in correlated clusters of detections and a cluster of uncorrelated detections considered as noise 32. For instance, a group of detections that move together spatially and temporally might form a cluster representing an object in motion, while isolated detections with no clear relationship to other detections would be classified as noise. Each non-noise cluster is treated as a candidate track. A fitness score is calculated for each candidate track 33, and tracks with scores below a user-selectable threshold are deemed "good" tracks, while those with scores above the threshold are considered "suspect" and further processed to determine if they are noise or conjoined tracks 34. For example, a candidate track with a fitness score of 0.7 might be considered "good" if the threshold is 0.8, while a candidate track with a score of 0.9 would be deemed "suspect" and undergo further analysis.

In at least one embodiment, conjoined tracks are disentangled and classified as separate "good" tracks, while noisy clusters are labeled as such. The process then iterates through all the good tracks to determine if any detections previously classified as noise are actually associated with good tracks 35. If an association is found, these detections are appended to the tracks. For instance, a detection classified as noise but found to be spatially and temporally close to a "good" track might be appended to that track.

Next, the process 400 checks if any tracks should be connected with another track 36, and if so, the individual tracks are conjoined and considered as one track. For example, two tracks representing an object that temporarily disappeared from the frame might be combined into a single, continuous track. Once the tracks are generated, the features of each track are calculated 37. These features may include track velocity and acceleration statistics, as well as the average size and intensity of the detections within the track. After the tracks and features have been generated, they are saved into a separate database 8. Finally, the features of each track are input into a machine-learning model that assigns a classification to each track 9. For instance, a track might be classified as a bird, a drone, or an airplane based on its calculated features.

Figure 5:
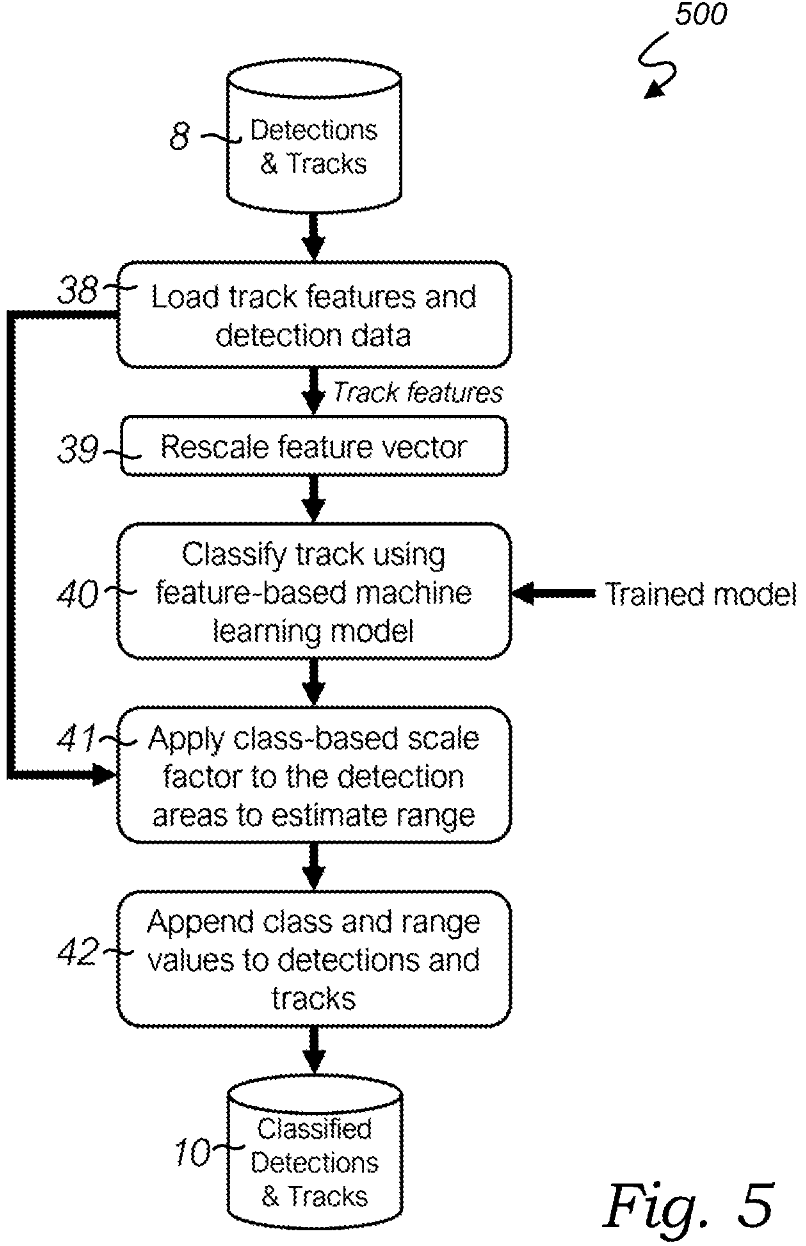
FIG. 5 is a flow diagram illustrating an exemplary method for a machine learning model to classify the tracks, estimate object range, and append class and range values to detections and tracks, in accordance with at least one embodiment.

FIG. 5 is a flow diagram illustrating an exemplary method for a machine learning model to classify the tracks, estimate object range, and append class and range values to detections and tracks, in accordance with at least one embodiment. In at least one such embodiment, the process 500 begins with detections and tracks 8 of FIG. 1, which are then used to load track features and detection data 38. For example, a track with a calculated velocity, acceleration, average size, and intensity is loaded, along with its associated detections. Each track has a feature vector that is rescaled in preparation for classification 39. For instance, a feature vector with values 0.5, 0.3, 0.7 might be rescaled to 0.8, 0.6, 1.0 to ensure compatibility with the machine learning model. The rescaled track feature vector is then fed into a machine learning model 40, which outputs a corresponding class for the track. Various machine learning models can be utilized, including but not limited to, neural networks, support vector machines, decision trees, random forests, k-neighbors, logistic regression, and naïve bayes. For example, a track's rescaled feature vector might be input into a support vector machine model, resulting in the classification of "bird."

In at least one embodiment, after classification, the target range can be calculated using stadiametric range finding techniques, the detection features, and a class-based scale factor 41. For example, if the classification is "bird," a scale factor specific to birds may be applied to the detection areas to estimate the range of the detected object. This might involve using known bird dimensions, camera properties, and detection features to determine the distance from the camera to the bird. The class and range estimates are appended to the detections and tracks 42. For instance, the "bird" classification and the calculated range (e.g., 100 meters) are added to the track information, resulting in a more comprehensive record of the detected object. Finally, the classified detections and tracks are saved to a database 10 for further analysis or visualization.

Figure 6:
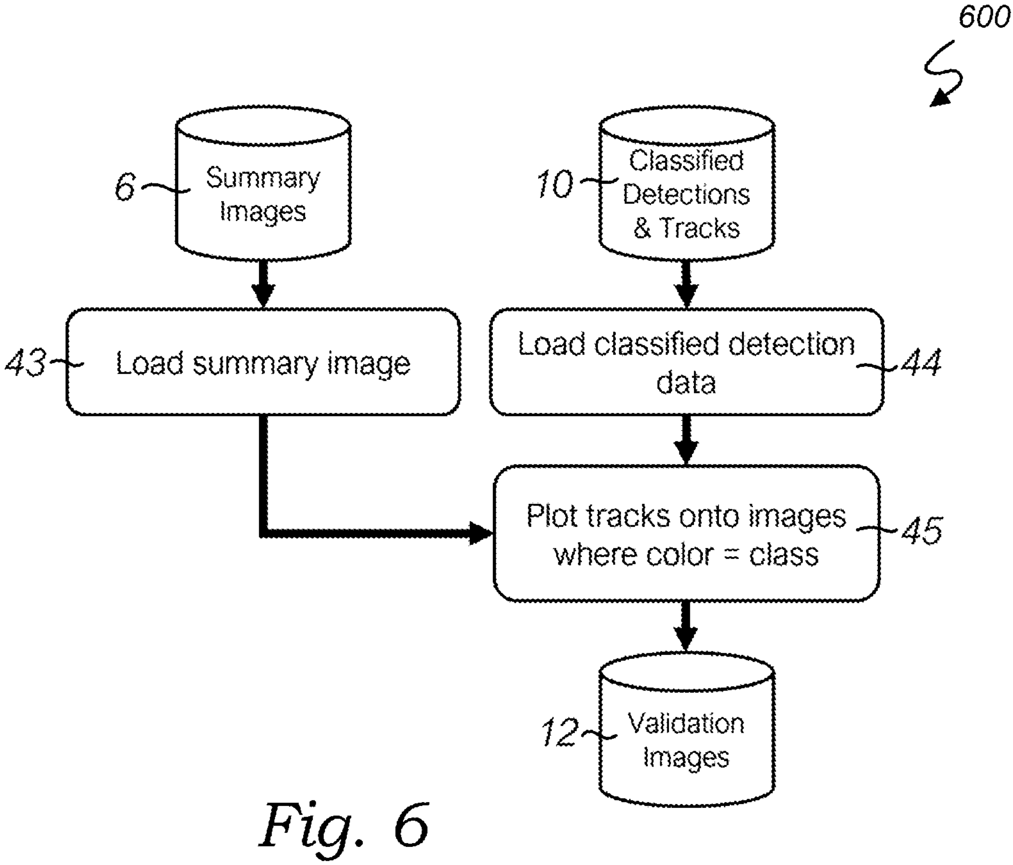
FIG. 6 is a flow diagram illustrating an exemplary method for visualizing classified detections and tracks on summary images, allowing for validation and performance evaluation of the object detection, tracking, and classification process in wind turbine monitoring, in accordance with at least one embodiment.

FIG. 6 is a flow diagram illustrating an exemplary method for visualizing classified detections and tracks on summary images, allowing for validation and performance evaluation of the object detection, tracking, and classification process in wind turbine monitoring, in accordance with at least one embodiment. In at least one such embodiment, the process 600 helps to evaluate the performance of the classification model and visualize individual flight paths of the detected objects. The process 600 starts with summary images 6, which are loaded using the "load summary image" step 43. For example, a summary image containing the average scene of a wind turbine farm and the detection canvas in contrasting colors is loaded. Concurrently, the classified detections and tracks 10 are loaded using the "load classified detection data" step 44. This data includes information such as object classification e.g., "bird," "drone," or "bat" and estimated range values. Next, the "plot tracks onto images where color=class" step 45 combines the summary images and the classified detection data. For instance, the track's detection points are plotted onto the summary image using colors that represent the class of the track. A bird track might be plotted in blue, a drone track in red, and a bat track in green. This visual representation allows for easier identification and differentiation of various object classes in the scene. The resulting images, known as validation images 12, enable users to quickly evaluate the performance of the classification model by examining the accuracy and consistency of the classifications. Additionally, these images provide valuable insights into the individual flight paths of the detected objects within the scene, helping analysts to understand the interactions and movements of different objects in the area.

Figure 7:
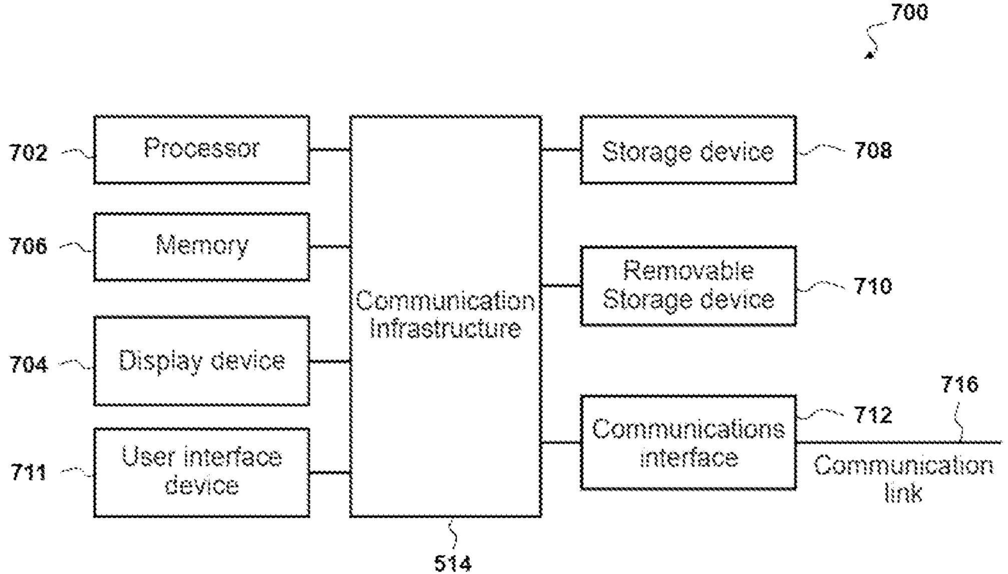
FIG. 7 is a block diagram illustrating an exemplary computing system, in accordance with at least one embodiment.

FIG. 7 is a high-level block diagram 700 showing a computing system comprising a computer system useful for implementing an embodiment of the system and process, disclosed herein, in accordance with at least one embodiment. Embodiments of the system may be implemented in different computing environments. The computer system includes one or more processors 702, and can further include an electronic display device 704 (e.g., for displaying graphics, text, and other data), a main memory 706 (e.g., random access memory RAM), a storage device 708, a removable storage device 710 (e.g., removable storage drive, a removable memory module, a magnetic tape drive, an optical disk drive, a computer-readable medium having stored therein computer software and/or data), a user interface device 711 (e.g., keyboard, touch screen, keypad, pointing device), and a communication interface 712 (e.g., modem, a network interface such as an Ethernet card, a communications port, or a PCMCIA slot and card). The communication interface 712 allows software and data to be transferred between the computer system and external devices. The system further includes a communications infrastructure 714 (e.g., a communications bus, cross-over bar, or network to which the aforementioned devices/modules are connected as shown). The information transferred via communications interface 714 may be in the form of signals such as electronic, electromagnetic, optical, or other signals capable of being received by communications interface 714, via a communication link 716 that carries signals and may be implemented using wire or cable, fiber optics, a phone line, a cellular/mobile phone link, a radio frequency RF link, and/or other communication channels. Computer program instructions representing the block diagram and/or flowcharts herein may be loaded onto a computer, programmable data processing apparatus, or processing devices to cause a series of operations performed thereon to produce a computer-implemented process.

Embodiments have been described with reference to flow diagram illustrations and/or block diagrams of methods, apparatus systems and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic-implementing embodiments. In alternative implementations, the functions noted in the blocks may occur out of the order noted in the figures, concurrently, etc. Computer programs (i.e., computer control logic) are stored in main memory and/or secondary memory. Computer programs may also be received via a communications interface 712. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 8:
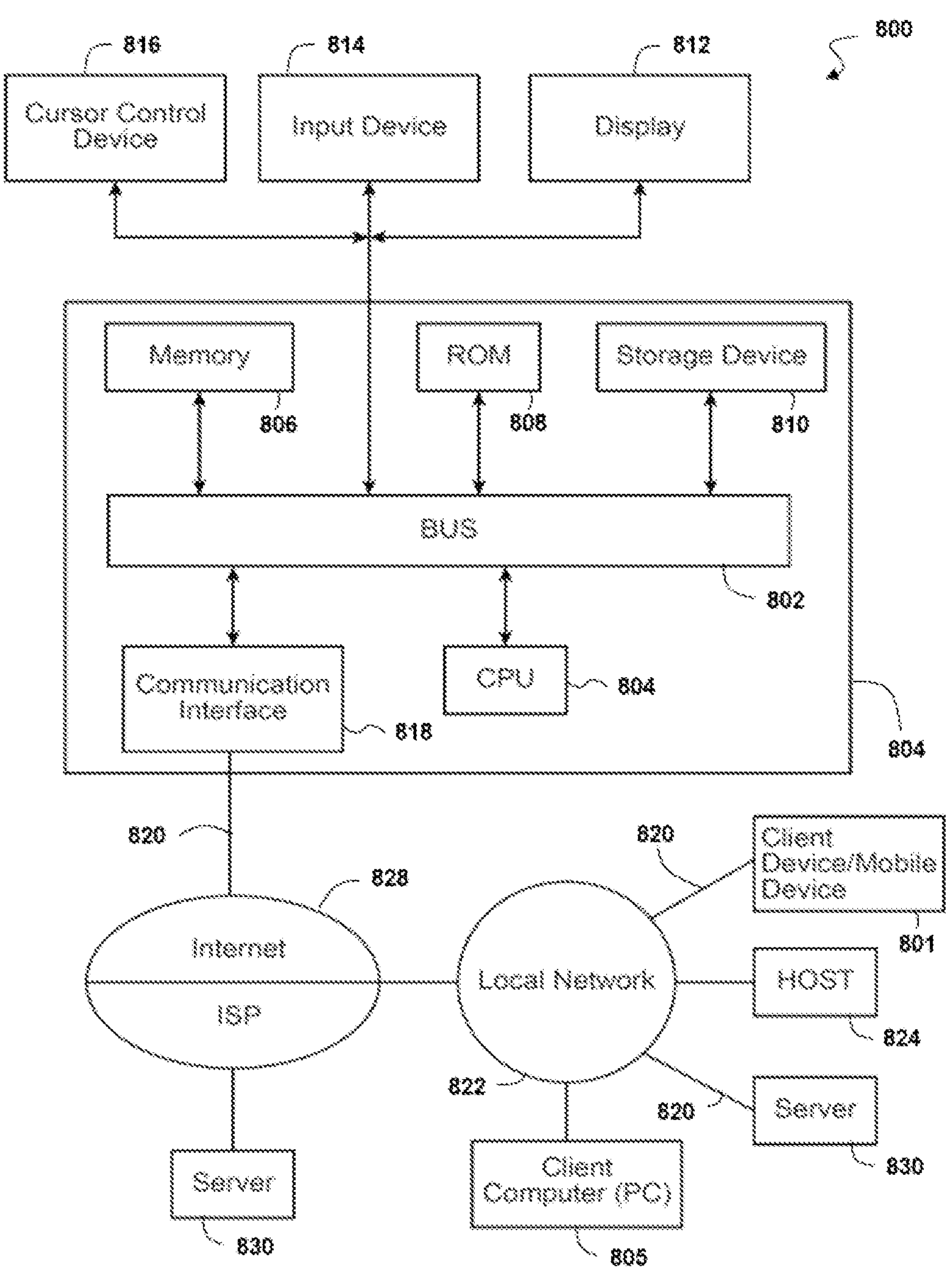
FIG. 8 is a block diagram illustrating an exemplary system for monitoring airborne targets, in accordance with at least one embodiment.

FIG. 8 is a block diagram of an exemplary system 800 for monitoring airborne targets, in accordance with at least one embodiment. In at least one such embodiment, the system 800 includes one or more client devices 801 such as consumer electronics devices, connected to one or more server computing systems 830. A server 830 includes a bus 802 or other communication mechanism for communicating information, and a processor CPU 804 coupled with the bus 802 for processing information. The server 830 also includes a main memory 806, such as a random access memory RAM or other dynamic storage device, coupled to the bus 802 for storing information and instructions to be executed by the processor 804. The main memory 806 also may be used for storing temporary variables or other intermediate information during execution or instructions to be executed by the processor 804. The server computer system 830 further includes a read only memory ROM 808 or other static storage device coupled to the bus 802 for storing static information and instructions for the processor 804. A storage device 810, such as a magnetic disk or optical disk, is provided and coupled to the bus 802 for storing information and instructions. The bus 802 may contain, for example, thirty-two address lines for addressing video memory or main memory 806. The bus 802 can also include, for example, a 32-bit data bus for transferring data between and among the components, such as the CPU 804, the main memory 806, video memory and the storage 810. Alternatively, multiplex data/address lines may be used instead of separate data and address lines.

The server 830 may be coupled via the bus 802 to a display 812 for displaying information to a computer user. An input device 814, including alphanumeric and other keys, is coupled to the bus 802 for communicating information and command selections to the processor 804. Another type or user input device comprises cursor control 816, such as a mouse, a trackball, or cursor direction keys for communicating direction information and command selections to the processor 804 and for controlling cursor movement on the display 812. In at least one embodiment, the functions are performed by the processor 804 executing one or more sequences of one or more instructions contained in the main memory 806. Such instructions may be read into the main memory 806 from another computer-readable medium, such as the storage device 810. Execution of the sequences of instructions contained in the main memory 806 causes the processor 804 to perform the process steps described herein. One or more processors in a multi-processing arrangement may also be employed to execute the sequences of instructions contained in the main memory 806. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs also called computer control logic are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 804 for execution. Such a medium may take many forms, including but not limited to, non-volatile media, volatile media, and transmission media. Non-volatile media includes, for example, optical or magnetic disks, such as the storage device 810. Volatile media includes dynamic memory, such as the main memory 806. Transmission media includes coaxial cables, copper wire and fiber optics, including the wires that comprise the bus 802. Transmission media can also take the form of acoustic or light waves, such as those generated during radio wave and infrared data communications. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 804 for execution. For example, the instructions may initially be carried on a magnetic disk of a remote computer. The remote computer can load the instructions into its dynamic memory and send the instructions over a telephone line using a modem. A modem local to the server 830 can receive the data on the telephone line and use an infrared transmitter to convert the data to an infrared signal. An infrared detector coupled to the bus 802 can receive the data carried in the infrared signal and place the data on the bus 802. The bus 802 carries the data to the main memory 806, from which the processor 804 retrieves and executes the instructions. The instructions received from the main memory 806 may optionally be stored on the storage device 810 either before or after execution by the processor 804.

The server 830 also includes a communication interface 818 coupled to the bus 802. The communication interface 818 provides a two-way data communication coupling to a network link 820 that is connected to the world wide packet data communication network now commonly referred to as the Internet 828. The Internet 828 uses electrical, electromagnetic or optical signals that carry digital data streams. The signals through the various networks and the signals on the network link 820 and through the communication interface 818, which carry the digital data to and from the server 830, are exemplary forms or carrier waves transporting the information.

In another embodiment of the server 830, interface 818 is connected to a network 822 via a communication link 820. For example, the communication interface 818 may be an integrated services digital network ISDN card or a modem to provide a data communication connection to a corresponding type of telephone line, which can comprise part of the network link 820. As another example, the communication interface 818 may be a local area network LAN card to provide a data communication connection to a compatible LAN. Wireless links may also be implemented. In any such implementation, the communication interface 818 sends and receives electrical electromagnetic or optical signals that carry digital data streams representing various types of information. The network link 820 typically provides data communication through one or more networks to other data devices. For example, the network link 820 may provide a connection through the local network 822 to a host computer 824 or to data equipment operated by an Internet Service Provider ISP. The ISP in turn provides data communication services through the Internet 828. The local network 822 and the Internet 828 both use electrical, electromagnetic or optical signals that carry digital data streams. The signals through the various networks and the signals on the network link 820 and through the communication interface 818, which carry the digital data to and from the server 830, are exemplary forms or carrier waves transporting the information.

The server 830 can send/receive messages and data, including e-mail, program code, through the network, the network link 820 and the communication interface 818. Further, the communication interface 818 can comprise a USB/Tuner and the network link 820 may be an antenna or cable for connecting the server 830 to a cable provider, satellite provider or other terrestrial transmission system for receiving messages, data and program code from another source.

The example versions of the embodiments described herein may be implemented as logical operations in a distributed processing system such as the system 800 including the servers 830. The logical operations of the embodiments may be implemented as a sequence of steps executing in the server 830, and as interconnected machine modules within the system 800. The implementation is a matter of choice and can depend on performance of the system 800 implementing the embodiments. As such, the logical operations constituting said example versions of the embodiments are referred to for e.g., as operations, steps or modules. Similar to a server 830 described above, a client device 801 can include a processor, memory, storage device, display, input device and communication interface (e.g., e-mail interface for connecting the client device to the Internet 828, the ISP, or LAN 822, for communication with the servers 830). The system 800 can further include computers e.g., personal computers, computing nodes 805 operating in the same manner as client devices 801, wherein a user can utilize one or more computers 805 to manage data in the server 830.

Figure 9:
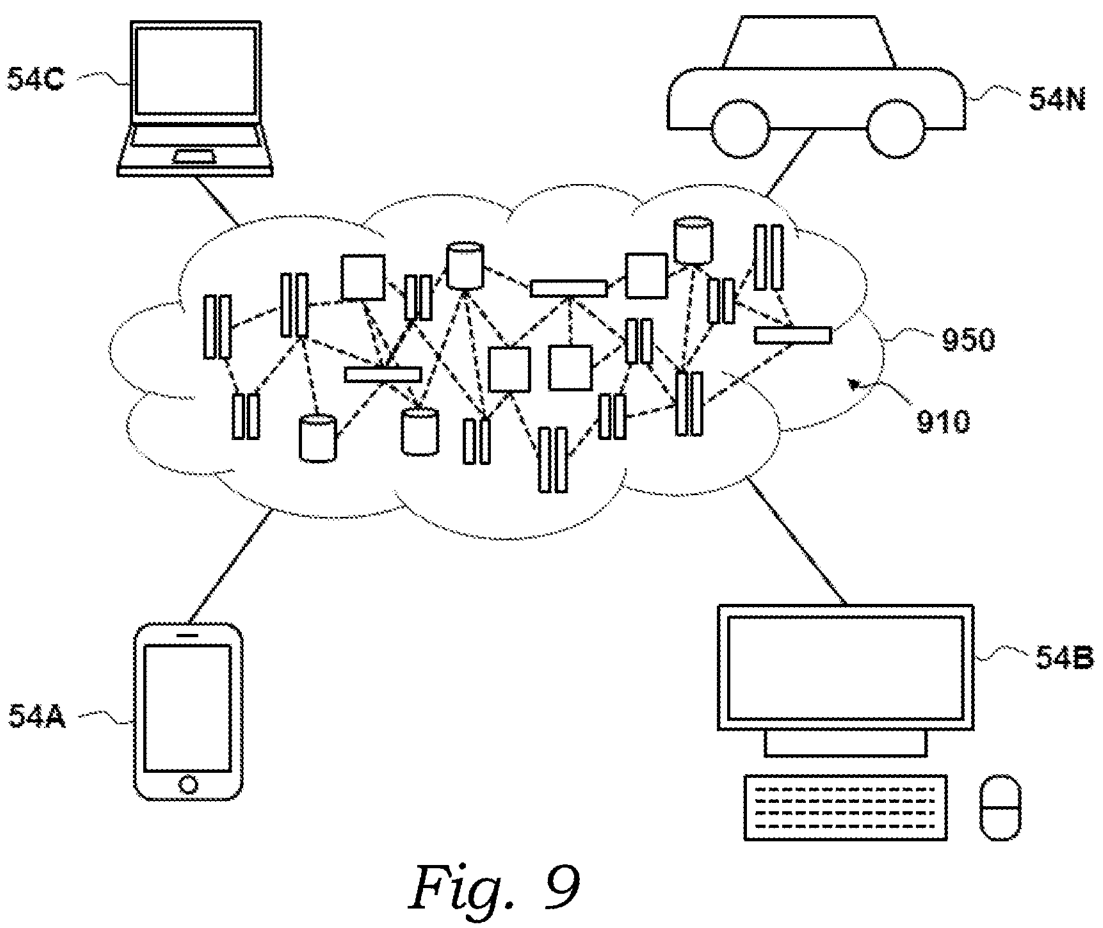
FIG. 9 is a simplified schematic illustrating an exemplary cloud computing environment for implementing an embodiment of the system and methods disclosed herein, in accordance with at least one embodiment.

FIG. 9 is a simplified schematic illustrating an exemplary cloud computing environment for implementing an embodiment of the system and methods disclosed herein, in accordance with at least one embodiment. In at least one such embodiment, cloud computing environment 950 comprises one or more cloud computing nodes 910 with which local computing devices used by cloud consumers, such as, for example, personal digital assistant PDA, smartphone, smart watch, set-top box, video game system, tablet, mobile computing device, or cellular telephone 54A, desktop computer 54B, laptop computer 54C, and/or automobile computer system 54N may communicate. Nodes 910 may communicate with one another. They may be grouped not shown physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 54A-N shown in FIG. 9 are intended to be illustrative only and that computing nodes 910 and cloud computing environment 950 can communicate with any type of computerized device over any type of network and/or network addressable connection e.g., using a web browser.

Aspects of the present specification may also be described as the following embodiments:

1. A method for automatically detecting, tracking and classifying an at least one object, moving within an environment proximal to a structure, using a camera positioned such that the structure is within a field of view of the camera, the method comprising the steps of, using at least one hardware processor: the processor receiving a plurality of video frames as captured by the camera; for each of the video frames: the processor performing a structure masking process on said video frame in order to isolate and subtract the structure from within said video frame; the processor detecting the presence of the at least one object within said video frame; and the processor calculating a plurality of detection features of the at least one detected object within said video frame; the processor creating a track for each of the at least one detected object, said track representing a path of movement followed by the corresponding one of the at least one detected object across the plurality of video frames; the processor identifying each track as either an acceptable track or noise; the processor calculating a plurality of track features for each acceptable track; the processor classifying each of the acceptable tracks; and the processor generating an at least one summary image that visually represents the at least one detected object within the environment proximal to the structure, allowing for validation and performance evaluation of the object detection, tracking, and classification process.
2. The method according to embodiment 1, wherein the structure is an at least one wind turbine.
3. The method according to embodiments 1-2, wherein the step of the processor performing a structure masking process on said video frame in order to isolate and subtract the structure from within said video frame further comprises the steps of: the processor calculating an image pixel intensity of the structure within said video frame at a plurality of predefined percentiles; the processor creating a threshold value using a weighted average of the percentile values; the processor creating a structure mask of all values above the threshold value; the processor dilating the structure mask so as to connect any nearby mask regions within said video frame; the processor locating each of an at least one contour in the structure mask, said at least one contour representing at least a portion of an outline of the structure within said video frame; and the processor flood-filling each of the at least one contour above a predefined area to better ensure that the structure mask does not include any of the at least one object.
4. The method according to embodiments 1-3, wherein the step of the processor detecting the presence of the at least one object within said video frame further comprises the steps of: the processor converting said video frame from color to a single-channel grayscale format; the processor feeding said single-channel grayscale converted video frame into a background subtractor that segments said video frame into a background portion and a foreground portion; the processor generating a detection mask by modeling the background portion of said video frame, subtracting the background portion from said video frame, and determining which parts of said video frame deviate by a pre-defined amount, with said parts of said video frame becoming part of the detection mask; the processor using the structure mask to remove any detections originating from the structure; the processor applying an at least one morphological operation to the detection mask; and the processor applying the detection mask to said video frame to create a masked frame.
5. The method according to embodiments 1-4, wherein the step of the processor calculating a plurality of detection features of the at least one detected object within said video frame further comprises the steps of, for each of the at least one detected object: the processor calculating a mean and standard deviation of an image pixel intensity of said detected object; the processor calculating at least one of a size of said detected object, a shape of said detected object, an area of said detected object, a perimeter length of said detected object, and a location of said detected object; and the processor storing said detection features in an at least one database.

6. The method according to embodiments 1-5, wherein the step of the processor creating a track for each of the at least one detected object further comprises the steps of, for each of the at least one detected object: the processor rescaling one or more of the detection features associated with said detected object so that said detection features share a common amplitude across the plurality of video frames in which said detected object is present; the processor creating a detection feature vector for each detection feature associated with said detected object across the plurality of video frames in which said detected object is present; the processor inputting each detection feature vector into a density-based clustering algorithm, resulting in correlated clusters of detections representing said detected object and a cluster of uncorrelated detections considered as noise; and the processor identifying each correlated cluster of detections as a candidate track; the processor calculating a fitness score for each candidate track.

7. The method according to embodiments 1-6, wherein the step of the processor identifying each track as either an acceptable track or noise further comprises the steps of: the processor calculating a fitness score for each candidate track; for each candidate track having a fitness score greater than or equal to a pre-defined threshold value, the processor classifying said candidate track as an acceptable track; for each candidate track having a fitness score less than the pre-defined threshold value, the processor classifying said candidate track as a suspect track, and further processing said candidate track to determine whether said candidate track is noise or a conjoined track; for each conjoined track, the processor disentangling said conjoined track and classifying said conjoined track as an acceptable track; for each detection classified as noise, the processor determining whether said noise is actually associated with an acceptable track, and if so, the processor appending said noise to said acceptable track; and the processor determining whether any of the acceptable tracks should be connected with another of the acceptable tracks, and if so, the processor merging said acceptable tracks into a single acceptable track.

8. The method according to embodiments 1-7, wherein the step of the processor calculating a plurality of track features for each acceptable track further comprises the steps of, for each acceptable track: the processor calculating a track velocity of said acceptable track; the processor calculating at least one of an average size of detections within said acceptable track, and an average intensity of detections within said acceptable track; and the processor storing said track features in an at least one database.

9. The method according to embodiments 1-8, wherein the step of the processor classifying each of the acceptable tracks further comprises the steps of, for each of the acceptable tracks: the processor rescaling one or more of the track features associated with said acceptable track; the processor creating a track feature vector for each track feature associated with said acceptable track; the processor inputting each track feature vector into a machine learning model, which outputs a corresponding track classification for said acceptable track; the processor calculating a target range for said acceptable track using stadiametric range finding techniques, the detection features, and a scale factor associated with the track classification for said acceptable track; and the processor appending each of the track classification and a range estimate for said acceptable track to the corresponding detection features and track features for said acceptable track.

10. The method according to embodiments 1-9, wherein the step of the processor generating an at least one summary image further comprises the steps of: the processor writing the masked frame onto a detection canvas that persists across the plurality of video frames; and the processor merging the accumulated detection canvas, the at least one detected object, and the associated acceptable tracks, resulting in the single summary image.

11. A non-transitory computer readable medium containing program instructions for causing an at least one processor to perform a method of automatically detecting, tracking and classifying an at least one object, moving within an environment proximal to a structure, using a camera positioned such that the structure is within a field of view of the camera, the method comprising the steps of: receiving a plurality of video frames as captured by the camera; for each of the video frames: performing a structure masking process on said video frame in order to isolate and subtract the structure from within said video frame; detecting the presence of the at least one object within said video frame; and calculating a plurality of detection features of the at least one detected object within said video frame; creating a track for each of the at least one detected object, said track representing a path of movement followed by the corresponding at least one detected object across the plurality of video frames; identifying each track as either an acceptable track or noise; calculating a plurality of track features for each acceptable track; classifying each of the acceptable tracks; and generating an at least one summary image that visually represents the at least one detected object within the environment proximal to the structure, allowing for validation and performance evaluation of the object detection, tracking, and classification process.

12. The method according to embodiment 11, wherein the structure is an at least one wind turbine.

13. The method according to embodiments 11-12, wherein the step of performing a structure masking process on said video frame in order to isolate and subtract the structure from within said video frame further comprises the steps of: calculating an image pixel intensity of the structure within said video frame at a plurality of predefined percentiles; creating a threshold value using a weighted average of the percentile values; creating a structure mask of all values above the threshold value; dilating the structure mask so as to connect any nearby mask regions within said video frame; locating each of an at least one contour in the structure mask, said at least one contour representing at least a portion of an outline of the structure within said video frame; and flood-filling each of the at least one contour above a predefined area to better ensure that the structure mask does not include any of the at least one object.

14. The method according to embodiments 11-13, wherein the step of detecting the presence of the at least one object within said video frame further comprises the steps of: converting said video frame from color to a single-channel grayscale format; feeding said single-channel grayscale converted video frame into a background subtractor that segments said video frame into a background portion and a foreground portion; generating a detection mask by modeling the background portion of said video frame, subtracting the background portion from said video frame, and determining which parts of said video frame deviate by a pre-defined amount, with said parts of said video frame becoming part of the detection mask; using the structure mask to remove any detections originating from the structure; applying an at least one morphological operation to the detection mask; and applying the detection mask to said video frame to create a masked frame.

15. The method according to embodiments 11-14, wherein the step of calculating a plurality of detection features of the at least one detected object within said video frame further comprises the steps of, for each of the at least one detected object: calculating a mean and standard deviation of an image pixel intensity of said detected object; calculating at least one of a size of said detected object, a shape of said detected object, an area of said detected object, a perimeter length of said detected object, and a location of said detected object; and storing said detection features in an at least one database.

16. The method according to embodiments 11-15, wherein the step of creating a track for each of the at least one detected object further comprises the steps of, for each of the at least one detected object: rescaling one or more of the detection features associated with said detected object so that said detection features share a common amplitude across the plurality of video frames in which said detected object is present; creating a detection feature vector for each detection feature associated with said detected object across the plurality of video frames in which said detected object is present; inputting each detection feature vector into a density-based clustering algorithm, resulting in correlated clusters of detections representing said detected object and a cluster of uncorrelated detections considered as noise; identifying each correlated cluster of detections as a candidate track; and calculating a fitness score for each candidate track.

17. The method according to embodiments 11-16, wherein the step of identifying each track as either an acceptable track or noise further comprises the steps of: calculating a fitness score for each candidate track; for each candidate track having a fitness score greater than or equal to a pre-defined threshold value, classifying said candidate track as an acceptable track; for each candidate track having a fitness score less than the pre-defined threshold value, classifying said candidate track as a suspect track, and further processing said candidate track to determine whether said candidate track is noise or a conjoined track; for each conjoined track, disentangling said conjoined track and classifying said conjoined track as an acceptable track; for each detection classified as noise, determining whether said noise is actually associated with an acceptable track, and if so, appending said noise to said acceptable track; and determining whether any of the acceptable tracks should be connected with another of the acceptable tracks, and if so, merging said acceptable tracks into a single acceptable track.

18. The method according to embodiments 11-17, wherein the step of calculating a plurality of track features for each acceptable track further comprises the steps of, for each acceptable track: calculating a track velocity of said acceptable track; calculating at least one of an average size of detections within said acceptable track, and an average intensity of detections within said acceptable track; and storing said track features in an at least one database.

19. The method according to embodiments 11-18, wherein the step of classifying each of the acceptable tracks further comprises the steps of, for each of the acceptable tracks: rescaling one or more of the track features associated with said acceptable track; creating a track feature vector for each track feature associated with said acceptable track; inputting each track feature vector into a machine learning model, which outputs a corresponding track classification for said acceptable track; calculating a target range for said 30 acceptable track using stadiametric range finding techniques, the detection features, and a scale factor associated with the track classification for said acceptable track; and appending each of the track classification and a range estimate for said acceptable track to the corresponding detection features and track features for said acceptable track.

20. The method according to embodiments 11-19, wherein the step of generating an at least one summary image further comprises the steps of: writing the masked frame onto a detection canvas that persists across the plurality of video frames; and merging the accumulated detection canvas, the at least one detected object, and the associated acceptable tracks, resulting in the single summary image.

21. A method for automatically detecting, tracking and classifying an at least one object, moving within an environment proximal to a structure, using a camera positioned such that the structure is within a field of view of the camera, the method comprising the steps of, using at least one hardware processor: the processor receiving a plurality of video frames as captured by the camera; for each of the video frames: the processor performing a structure masking process on said video frame in order to isolate and subtract the structure from within said video frame, said structure masking process comprising the steps of: the processor calculating an image pixel intensity of the structure within said video frame at a plurality of predefined percentiles; the processor creating a threshold value using a weighted average of the percentile values; the processor creating a structure mask of all values above the threshold value; the processor dilating the structure mask so as to connect any nearby mask regions within said video frame; the processor locating each of an at least one contour in the structure mask, said at least one contour representing at least a portion of an outline of the structure within said video frame; and the processor flood-filling each of the at least one contour above a predefined area to better ensure that the structure mask does not include any of the at least one object; the processor detecting the presence of the at least one object within said video frame, said object detection process comprising the steps of: the processor converting said video frame from color to a single-channel grayscale format; the processor feeding said single-channel grayscale converted video frame into a background subtractor that segments said video frame into a background portion and a foreground portion; the processor generating a detection mask by modeling the background portion of said video frame, subtracting the background portion from said video frame, and determining which parts of said video frame deviate by a pre-defined amount, with said parts of said video frame becoming part of the detection mask; the processor using the structure mask to remove any detections originating from the structure; the processor applying an at least one morphological operation to the detection mask; and the processor applying the detection mask to said video frame to create a masked frame; and the processor calculating a plurality of detection features of the at least one detected object within said video frame, said detection feature calculation process comprising the steps of, for each of the at least one detected object: the processor calculating a mean and standard deviation of an image pixel intensity of said detected object; the processor calculating at least one of a size of said detected object, a shape of said detected object, an area of said detected object, a perimeter length of said detected object, and a location of said detected object; and the processor storing said detection features in an at least one database; the processor creating a track for each of the at least one detected object, said track representing a path of movement followed by the corresponding at least one detected object across the plurality of video frames, the track creation process comprising the steps of, for each of the at least one detected object: the processor rescaling one or more of the detection features associated with said detected object so that said detection features share a common amplitude across the plurality of video frames in which said detected object is present; the processor creating a detection feature vector for each detection feature associated with said detected object across the plurality of video frames in which said detected object is present; the processor inputting each detection feature vector into a density-based clustering algorithm, resulting in correlated clusters of detections representing said detected object and a cluster of uncorrelated detections considered as noise; and the processor identifying each correlated cluster of detections as a candidate track; the processor identifying each track as either an acceptable track or noise, the track identification process comprising the step of: the processor calculating a fitness score for each candidate track; for each candidate track having a fitness score greater than or equal to a pre-defined threshold value, the processor classifying said candidate track as an acceptable track; for each candidate track having a fitness score less than the pre-defined threshold value, the processor classifying said candidate track as a suspect track, and further processing said candidate track to determine whether said candidate track is noise or a conjoined track; for each conjoined track, the processor disentangling said conjoined track and classifying said conjoined track as an acceptable track; for each detection classified as noise, the processor determining whether said noise is actually associated with an acceptable track, and if so, the processor appending said noise to said acceptable track; the processor determining whether any of the acceptable tracks should be connected with another of the acceptable tracks, and if so, the processor merging said acceptable tracks into a single acceptable track; the processor calculating a plurality of track features for each acceptable track, said feature calculation process comprising the steps of, for each acceptable track: the processor calculating a track velocity of said acceptable track; the processor calculating at least one of an average size of detections within said acceptable track, and an average intensity of detections within said acceptable track; and the processor storing said track features in an at least one database; the processor classifying each of the acceptable tracks, the classification process comprising the steps of, for each of the acceptable tracks: the processor rescaling one or more of the track features associated with said acceptable track; the processor creating a track feature vector for each track feature associated with said acceptable track; the processor inputting each track feature vector into a machine learning model, which outputs a corresponding track classification for said acceptable track; the processor calculating a target range for said acceptable track using stadiametric range finding techniques, the detection features, and a scale factor associated with the track classification for said acceptable track; and the processor appending each of the track classification and a range estimate for said acceptable track to the corresponding detection features and track features for said acceptable track; and the processor generating an at least one summary image that visually represents the at least one detected object within the environment proximal to the structure, allowing for validation and performance evaluation of the object detection, tracking, and classification process, the summary image generation process comprising the steps of: the processor writing the masked frame onto a detection canvas that persists across the plurality of video frames; and the processor merging the accumulated detection canvas, the at least one detected object, and the associated acceptable tracks, resulting in the single summary image.

In closing, regarding the exemplary embodiments of the present invention as shown and described herein, it will be appreciated that a system and associated methods are disclosed and configured for automatically detecting, tracking and classifying an at least one object, moving within an environment proximal to a structure, using a camera. Because the principles of the invention may be practiced in a number of configurations beyond those shown and described, it is to be understood that the invention is not in any way limited by the exemplary embodiments, but is generally directed to an object detection and monitoring system and is able to take numerous forms to do so without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art, or at least encompassing a range of plus or minus ten percent above and below the value of the stated characteristic, item, quantity, parameter, property, or term.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112 (f) will begin with the words "means for," but use of the term "for" in any other context is not intended to invoke treatment under 35 U.S.C. § 112 (f). Accordingly, Applicant reserves the right to pursue additional claims after filing this application, in either this application or in a continuing application.

It should be understood that any logic code, programs, modules, processes, and/or methods disclosed herein, along with the order in which the respective elements of any such method are performed, are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment. Additionally, the various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The phrase "non-transitory," in addition to having its ordinary meaning, as used in this document means "enduring or long-lived." The phrase "non-transitory computer readable medium," in addition to having its ordinary meaning, includes any and all computer readable mediums, with the sole exception of a transitory, propagating signal. This includes, by way of example and not limitation, non-transitory computer-readable mediums such as register memory, processor cache and random-access memory ("RAM").

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for automatically detecting, tracking and classifying an at least one object, moving within an environment proximal to a structure, using a camera positioned such that the structure is within a field of view of the camera, the method comprising the steps of, using at least one hardware processor:

- the processor receiving a plurality of video frames as captured by the camera;
- for each of the video frames:
  - the processor performing a structure masking process on said video frame in order to isolate and subtract the structure from within said video frame;
  - the processor detecting the presence of the at least one object within said video frame; and
  - the processor calculating a plurality of detection features of the at least one detected object within said video frame;
- the processor creating a track for each of the at least one detected object, said track representing a path of movement followed by the corresponding one of the at least one detected object across the plurality of video frames, the track creation process comprising the steps of, for each of the at least one detected object:
  - the processor rescaling one or more of the detection features associated with said detected object so that said detection features share a common amplitude across the plurality of video frames in which said detected object is present;
  - the processor creating a detection feature vector for each detection feature associated with said detected object across the plurality of video frames in which said detected object is present;
  - the processor inputting each detection feature vector into a density-based clustering algorithm, resulting in correlated clusters of detections representing said detected object and a cluster of uncorrelated detections considered as noise; and
  - the processor identifying each correlated cluster of detections as a candidate track;
- the processor identifying each track as either an acceptable track or noise;
- the processor calculating a plurality of track features for each acceptable track;
- the processor classifying each of the acceptable tracks; and
- the processor generating an at least one summary image that visually represents the at least one detected object within the environment proximal to the structure, allowing for validation and performance evaluation of the object detection, tracking, and classification process.

2. The method of claim 1, wherein the structure is an at least one wind turbine.

3. The method of claim 1, wherein the step of the processor performing a structure masking process on said video frame in order to isolate and subtract the structure from within said video frame further comprises the steps of:

the processor calculating an image pixel intensity of the structure within said video frame at a plurality of predefined percentiles;

the processor calculating a weighted average of the pre-defined percentile values and setting the weighted average of the predefined percentile values as a threshold value;

the processor creating a structure mask of all values above the threshold value;

the processor dilating the structure mask so as to connect any nearby mask regions within said video frame;

the processor locating each of an at least one contour in the structure mask, said at least one contour representing at least a portion of an outline of the structure within said video frame; and the processor flood-filling each of the at least one contour above a predefined area to better ensure that the structure mask does not include any of the at least one object.

4. The method of claim 3, wherein the step of the processor detecting the presence of the at least one object within said video frame further comprises the steps of:

the processor converting said video frame from color to a single-channel grayscale format;

the processor feeding said single-channel grayscale converted video frame into a background subtractor that segments said video frame into a background portion and a foreground portion;

the processor generating a detection mask by modeling the background portion of said video frame, subtracting the background portion from said video frame, and determining which parts of said video frame deviate by a pre-defined amount, with said parts of said video frame becoming part of the detection mask;

the processor using the structure mask to remove any detections originating from the structure;

the processor applying an at least one morphological operation to the detection mask; and the processor applying the detection mask to said video frame to create a masked frame.

5. The method of claim 4, wherein the step of the processor calculating a plurality of detection features of the at least one detected object within said video frame further comprises the steps of, for each of the at least one detected object:

the processor calculating a mean and standard deviation of an image pixel intensity of said detected object;

the processor calculating at least one of a size of said detected object, a shape of said detected object, an area of said detected object, a perimeter length of said detected object, and a location of said detected object; and the processor storing said detection features in an at least one database.

6. The method of claim 5, wherein the step of the processor identifying each track as either an acceptable track or noise further comprises the steps of:

the processor calculating a fitness score for each candidate track;

for each candidate track having a fitness score greater than or equal to a pre-defined threshold value, the processor classifying said candidate track as an acceptable track;

for each candidate track having a fitness score less than the pre-defined threshold value, the processor classifying said candidate track as a suspect track, and further processing said candidate track to determine whether said candidate track is noise or a conjoined track;

for each conjoined track, the processor disentangling said conjoined track and classifying said conjoined track as an acceptable track;

for each detection classified as noise, the processor determining whether said noise is actually associated with an acceptable track, and if so, the processor appending said noise to said acceptable track; and the processor determining whether any of the acceptable tracks should be connected with another of the acceptable tracks, and if so, the processor merging said acceptable tracks into a single acceptable track.

7. The method of claim 6, wherein the step of the processor calculating a plurality of track features for each acceptable track further comprises the steps of, for each acceptable track:

the processor calculating a track velocity of said acceptable track;

the processor calculating at least one of an average size of detections within said acceptable track, and an average intensity of detections within said acceptable track; and the processor storing said track features in an at least one database.

8. The method of claim 7, wherein the step of the processor classifying each of the acceptable tracks further comprises the steps of, for each of the acceptable tracks:

the processor rescaling one or more of the track features associated with said acceptable track;

the processor creating a track feature vector for each track feature associated with said acceptable track;

the processor inputting each track feature vector into a machine learning model, which outputs a corresponding track classification for said acceptable track;

the processor calculating a target range for said acceptable track using stadiametric range finding techniques, the detection features, and a scale factor associated with the track classification for said acceptable track; and the processor appending each of the track classification and a range estimate for said acceptable track to the corresponding detection features and track features for said acceptable track.

9. The method of claim 8, wherein the step of the processor generating an at least one summary image further comprises the steps of:

the processor writing the masked frame onto a detection canvas that persists across the plurality of video frames; and the processor merging the accumulated detection canvas, the at least one detected object, and the associated acceptable tracks, resulting in the single summary image.

10. A non-transitory computer readable medium containing program instructions for causing an at least one processor to perform a method of automatically detecting, tracking and classifying an at least one object, moving within an environment proximal to a structure, using a camera positioned such that the structure is within a field of view of the camera, the method comprising the steps of:

receiving a plurality of video frames as captured by the camera;

for each of the video frames:

performing a structure masking process on said video frame in order to isolate and subtract the structure from within said video frame;

detecting the presence of the at least one object within said video frame; and p2 calculating a plurality of detection features of the at least one detected object within said video frame;

creating a track for each of the at least one detected object, said track representing a path of movement followed by the corresponding one of the at least one detected object across the plurality of video frames, the track creation process comprising the steps of, for each of the at least one detected object:

rescaling one or more of the detection features associated with said detected object so that said detection features share a common amplitude across the plurality of video frames in which said detected object is present;

creating a detection feature vector for each detection feature associated with said detected object across the plurality of video frames in which said detected object is present;

inputting each detection feature vector into a density-based clustering algorithm, resulting in correlated clusters of detections representing said detected object and a cluster of uncorrelated detections considered as noise; and identifying each correlated cluster of detections as a candidate track;

identifying each track as either an acceptable track or noise;

calculating a plurality of track features for each acceptable track;

classifying each of the acceptable tracks; and generating an at least one summary image that visually represents the at least one detected object within the environment proximal to the structure, allowing for validation and performance evaluation of the object detection, tracking, and classification process.

11. The method of claim 10, wherein the step of performing a structure masking process on said video frame in order to isolate and subtract the structure from within said video frame further comprises the steps of:

calculating an image pixel intensity of the structure within said video frame at a plurality of predefined percentiles;

calculating a weighted average of the predefined percentile values and setting the weighted average of the predefined percentile values as a threshold value;

creating a structure mask of all values above the threshold value;

dilating the structure mask so as to connect any nearby mask regions within said video frame;

locating each of an at least one contour in the structure mask, said at least one contour representing at least a portion of an outline of the structure within said video frame; and flood-filling each of the at least one contour above a predefined area to better ensure that the structure mask does not include any of the at least one object.

12. The method of claim 11, wherein the step of detecting the presence of the at least one object within said video frame further comprises the steps of:

converting said video frame from color to a single-channel grayscale format;

feeding said single-channel grayscale converted video frame into a background subtractor that segments said video frame into a background portion and a foreground portion;

generating a detection mask by modeling the background portion of said video frame, subtracting the background portion from said video frame, and determining which parts of said video frame deviate by a pre-defined amount, with said parts of said video frame becoming part of the detection mask;

using the structure mask to remove any detections originating from the structure;

applying an at least one morphological operation to the detection mask; and applying the detection mask to said video frame to create a masked frame.

13. The method of claim 12, wherein the step of calculating a plurality of detection features of the at least one detected object within said video frame further comprises the steps of, for each of the at least one detected object:

calculating a mean and standard deviation of an image pixel intensity of said detected object;

calculating at least one of a size of said detected object, a shape of said detected object, an area of said detected object, a perimeter length of said detected object, and a location of said detected object; and storing said detection features in an at least one database.

14. The method of claim 13, wherein the step of identifying each track as either an acceptable track or noise further comprises the steps of:

calculating a fitness score for each candidate track;

for each candidate track having a fitness score greater than or equal to a pre-defined threshold value, classifying said candidate track as an acceptable track;

for each candidate track having a fitness score less than the pre-defined threshold value, classifying said candidate track as a suspect track, and further processing said candidate track to determine whether said candidate track is noise or a conjoined track;

for each conjoined track, disentangling said conjoined track and classifying said conjoined track as an acceptable track;

for each detection classified as noise, determining whether said noise is actually associated with an acceptable track, and if so, appending said noise to said acceptable track; and determining whether any of the acceptable tracks should be connected with another of the acceptable tracks, and if so, merging said acceptable tracks into a single acceptable track.

15. The method of claim 14, wherein the step of calculating a plurality of track features for each acceptable track further comprises the steps of, for each acceptable track:

calculating a track velocity of said acceptable track;

calculating at least one of an average size of detections within said acceptable track, and an average intensity of detections within said acceptable track; and storing said track features in an at least one database.

16. The method of claim 15, wherein the step of classifying each of the acceptable tracks further comprises the steps of, for each of the acceptable tracks:

rescaling one or more of the track features associated with said acceptable track;

creating a track feature vector for each track feature associated with said acceptable track;

inputting each track feature vector into a machine learning model, which outputs a corresponding track classification for said acceptable track;

calculating a target range for said acceptable track using stadiametric range finding techniques, the detection features, and a scale factor associated with the track classification for said acceptable track; and appending each of the track classification and a range estimate for said acceptable track to the corresponding detection features and track features for said acceptable track.

17. The method of claim 16, wherein the step of generating an at least one summary image further comprises the steps of:

writing the masked frame onto a detection canvas that persists across the plurality of video frames; and merging the accumulated detection canvas, the at least one detected object, and the associated acceptable tracks, resulting in the single summary image.

18. A method for automatically detecting, tracking and classifying an at least one object, moving within an environment proximal to a structure, using a camera positioned such that the structure is within a field of view of the camera, the method comprising the steps of, using at least one hardware processor:

the processor receiving a plurality of video frames as captured by the camera;

for each of the video frames:

the processor performing a structure masking process on said video frame in order to isolate and subtract the structure from within said video frame, said structure masking process comprising the steps of:

the processor calculating an image pixel intensity of the structure within said video frame at a plurality of predefined percentiles;

the processor calculating a weighted average of the predefined percentile values and setting the weighted average of the predefined percentile values as a threshold value;

the processor creating a structure mask of all values above the threshold value;

the processor dilating the structure mask so as to connect any nearby mask regions within said video frame;

the processor locating each of an at least one contour in the structure mask, said at least one contour representing at least a portion of an outline of the structure within said video frame; and the processor flood-filling each of the at least one contour above a predefined area to better ensure that the structure mask does not include any of the at least one object;

the processor detecting the presence of the at least one object within said video frame, said object detection process comprising the steps of:

the processor converting said video frame from color to a single-channel grayscale format;

the processor feeding said single-channel grayscale converted video frame into a background subtractor that segments said video frame into a background portion and a foreground portion;

the processor generating a detection mask by modeling the background portion of said video frame, subtracting the background portion from said video frame, and determining which parts of said video frame deviate by a pre-defined amount, with said parts of said video frame becoming part of the detection mask;

the processor using the structure mask to remove any detections originating from the structure;

the processor applying an at least one morphological operation to the detection mask; and the processor applying the detection mask to said video frame to create a masked frame; and the processor calculating a plurality of detection features of the at least one detected object within said video frame, said detection feature calculation process comprising the steps of, for each of the at least one detected object:

the processor calculating a mean and standard deviation of an image pixel intensity of said detected object;

the processor calculating at least one of a size of said detected object, a shape of said detected object, an area of said detected object, a perimeter length of said detected object, and a location of said detected object; and the processor storing said detection features in an at least one database;

the processor creating a track for each of the at least one detected object, said track representing a path of movement followed by the corresponding one of the at least one detected object across the plurality of video frames, the track creation process comprising the steps of, for each of the at least one detected object:

the processor rescaling one or more of the detection features associated with said detected object so that said detection features share a common amplitude across the plurality of video frames in which said detected object is present;

the processor creating a detection feature vector for each detection feature associated with said detected object across the plurality of video frames in which said detected object is present;

the processor inputting each detection feature vector into a density-based clustering algorithm, resulting in correlated clusters of detections representing said detected object and a cluster of uncorrelated detections considered as noise; and the processor identifying each correlated cluster of detections as a candidate track;

the processor identifying each track as either an acceptable track or noise, the track identification process comprising the step of:

the processor calculating a fitness score for each candidate track;

for each candidate track having a fitness score greater than or equal to a pre-defined threshold value, the processor classifying said candidate track as an acceptable track;

for each candidate track having a fitness score less than the pre-defined threshold value, the processor classifying said candidate track as a suspect track, and further processing said candidate track to determine whether said candidate track is noise or a conjoined track;

for each conjoined track, the processor disentangling said conjoined track and classifying said conjoined track as an acceptable track;

for each detection classified as noise, the processor determining whether said noise is actually associated with an acceptable track, and if so, the processor appending said noise to said acceptable track;

the processor determining whether any of the acceptable tracks should be connected with another of the acceptable tracks, and if so, the processor merging said acceptable tracks into a single acceptable track;

the processor calculating a plurality of track features for each acceptable track, said feature calculation process comprising the steps of, for each acceptable track:

the processor calculating a track velocity of said acceptable track;

the processor calculating at least one of an average size of detections within said acceptable track, and an average intensity of detections within said acceptable track; and the processor storing said track features in an at least one database;

the processor classifying each of the acceptable tracks, the classification process comprising the steps of, for each of the acceptable tracks:

the processor rescaling one or more of the track features associated with said acceptable track;

the processor creating a track feature vector for each track feature associated with said acceptable track;

the processor inputting each track feature vector into a machine learning model, which outputs a corresponding track classification for said acceptable track;

the processor calculating a target range for said acceptable track using stadiametric range finding techniques, the detection features, and a scale factor associated with the track classification for said acceptable track; and the processor appending each of the track classification and a range estimate for said acceptable track to the corresponding detection features and track features for said acceptable track; and the processor generating an at least one summary image that visually represents the at least one detected object within the environment proximal to the structure, allowing for validation and performance evaluation of the object detection, tracking, and classification process, the summary image generation process comprising the steps of:

the processor writing the masked frame onto a detection canvas that persists across the plurality of video frames; and the processor merging the accumulated detection canvas, the at least one detected object, and the associated acceptable tracks, resulting in the single summary image.

* * * * *